United States Patent
Wenning et al.

(10) Patent No.: US 6,960,620 B2
(45) Date of Patent: Nov. 1, 2005

(54) POWDER COATING COMPOSITIONS COMPRISING CRYSTALLINE URETHANE ACRYLATES AND USE THEREOF

(75) Inventors: Andreas Wenning, Nottuln (DE); Giselher Franzmann, Witten (DE); Emmanouil Spyrou, Marl (DE)

(73) Assignee: Degussa AG, Duesseldorf (DE)

( * ) Notice: Subject to any disclaimer, the term of this patent is extended or adjusted under 35 U.S.C. 154(b) by 245 days.

(21) Appl. No.: 10/325,933

(22) Filed: Dec. 23, 2002

(65) Prior Publication Data

US 2003/0175433 A1 Sep. 18, 2003

(30) Foreign Application Priority Data

Dec. 22, 2001 (DE) .......................... 101 63 825

(51) Int. Cl.$^7$ .............................................. C08G 18/62
(52) U.S. Cl. ........................ 522/93; 526/301; 427/494; 427/508
(58) Field of Search ............................ 522/93; 526/301; 427/494, 508

(56) References Cited

U.S. PATENT DOCUMENTS

| 4,552,932 A | | 11/1985 | Schollenberger |
| 5,639,560 A | | 6/1997 | Moens et al. |
| 6,136,882 A | * | 10/2000 | Daly et al. .................. 522/107 |
| 6,284,321 B1 | * | 9/2001 | Brindoepke et al. ..... 427/385.5 |
| 2002/0099127 A1 | | 7/2002 | Wenning et al. |
| 2003/0087029 A1 | * | 5/2003 | Decker et al. .............. 427/195 |

FOREIGN PATENT DOCUMENTS

| WO | WO 99/14254 | 3/1999 |
| WO | WO 02/50147 | 6/2002 |

* cited by examiner

*Primary Examiner*—Rachel Gorr
(74) *Attorney, Agent, or Firm*—Oblon, Spivak, McClelland, Maier & Neustadt, P.C.

(57) ABSTRACT

A radiation-curable powder coating compositions based on crystalline urethane acrylates, which crosslink to light-stable and weather-stable coating films.

23 Claims, No Drawings

POWDER COATING COMPOSITIONS COMPRISING CRYSTALLINE URETHANE ACRYLATES AND USE THEREOF

BACKGROUND OF THE INVENTION

1. Field of the Invention

The present invention relates to radiation-curable powder coating compositions based on crystalline urethane acrylates, which crosslink to provide light-stable and weather-stable coating films.

2. Description of the Background

Thermal crosslinkable powder coating materials are known and are frequently used in the coatings-processing industry. For example, DE-C 27 35 497 describes PU powder coatings having outstanding weathering stability and thermal stability. The crosslinkers whose preparation is described in DE-C 27 12 931 are composed of ε-caprolactam-blocked isophorone diisocyanate containing isocyanurate groups. Also known are polyisocyanates containing urethane, biuret or urea groups, whose isocyanate groups are likewise blocked.

The disadvantage of these systems lies in the elimination of the blocking agent in the course of the thermal crosslinking reaction. Since the blocking agent may therefore be emitted into the environment, it is necessary on ecological and workplace safety grounds to take special precautions to clean the outgoing air and/or to recover the blocking agent. Moreover, the reactivity of the crosslinkers is low. Curing temperatures above 170° C. are required.

Both disadvantages, emission of blocking agent and curing at high temperatures, can be eliminated by means of powder coating materials which cure, not thermally, but instead by means of radiation. Radiation-curable powder coating materials of this kind are known and are described, for example, in U.S. Pat. No. 3,485,732, EP 0407826, EP 0636669, WO 99/14254, U.S. Pat. Nos. 3,974,303, 5,639,560 and EP 0934359.

EP 0636669 and WO 99/14254 describe two-component radiation-curable powder coating materials based on an unsaturated polyester and on a vinyl ether. The coatings produced from them are unsuitable for exterior use, since they yellow severely.

U.S. Pat. No. 3,974,303 describes thermoplastic resins containing from 0.5 to 3.5 polymerizable unsaturated groups per 1000 g molecular weight. The polyurethanes described (see Example 1) are, however, not weather-stable and, on account of the absence of polyester groups and the low chain length, possess a low flexibility.

EP 0934359 describes pulverulent, radiation-curable mixtures of amorphous and crystalline polyesters containing terminal methacrylate groups. The flexibility and adhesion of the powder coatings produced from these mixtures are no more than satisfactory.

U.S. Pat. No. 5,639,560 describes radiation-curable powder compositions comprising special crystalline polyesters, containing methacrylate groups terminally, as binders. The binders are prepared by reacting crystalline polyesters with glycidyl methacrylate. The coatings produced from these powder coating compositions are very flexible.

There remains a continuing need for radiation-curable powder coating compositions which overcome the difficulties described above.

SUMMARY OF THE INVENTION

It is an object of the present invention to provide radiation-curable powder coating compositions which are stable on storage and which also, in the form of coating films, cure to provide coatings combining high flexibility and exterior weather stability with high adhesion and very good leveling.

It has surprisingly been possible to achieve this object by means of a radiation-curable powder coating composition comprising as binder at least one crystalline urethane acrylate having a melting point of 40–130° C.

Thus, the invention provides radiation-curable powder coating compositions, comprising:

I. a binder composed of at least one crystalline urethane acrylate with a melting point of from 40 to 130° C., and
II. auxiliaries and additives.

The invention likewise provides for the use of compositions comprising:

I. a binder composed of at least one crystalline urethane acrylate with a melting point of from 40 to 130° C., and
II. auxiliaries and additives for preparing radiation-curable powder coating compositions.

The invention further provides a process for preparing radiation-curable powder coating compositions, comprising:

I. a binder composed of at least one crystalline urethane acrylate with a melting point of from 40 to 130° C., and
II. auxiliaries and additives, observing an upper temperature limit of between 120° C. and 130° C., in heatable kneading apparatus, especially extruders.

The invention also provides a process for producing coatings by using radiation-curable powder coating compositions comprising:

I. a binder composed of at least one crystalline urethane acrylate with a melting point of from 40 to 130° C., and
II. auxiliaries and additives.

Thus, the present invention provides a process for preparing a radiation-curable powder coating composition described above, comprising combining the binder (I) and the auxiliaries and additives (II).

The present invention also provides a method of coating a substrate comprising applying the radiation-curable powder coating composition described above to the substrate.

A more complete appreciation of the invention and many of the attendant advantages thereof will be readily obtained as the same becomes better understood by reference to the following detailed description below.

DETAILED DESCRIPTION OF THE INVENTION

Urethane acrylates in the context of this invention are composed of a hydroxyl-containing polyester to which urethane groups and acrylate groups are attached by reaction with polyisocyanates and acrylate-functional alcohols.

The crystalline urethane acrylates of the invention are prepared from crystalline, hydroxyl-containing polyesters (I.1) having a melting point of 40–130° C. by reaction with polyisocyanates (I.2) and a compound including both at least one alcohol group and at least one polymerizable acrylate group (I.3). They contain both urethane groups and terminal acrylate groups. This range for the melting point of the crystallization urethane acrylate includes all specific values and subranges therebetween, such as 50, 60, 70, 80, 90, 100, 110, 120, and 130° C.

The crystalline, hydroxyl-containing polyesters I.1 having a melting point of 40–130° C. are prepared by polycondensation from appropriate dicarboxylic acids and diols. Condensation takes place conventionally in an inert gas atmosphere at temperatures from 100 to 260° C., preferably from 130 to 220° C., in the melt or in an azeotropic procedure, as described, for example, in Methoden der Organischen Chemie (Houben-Weyl); Volume 14/2, pages 1 to 5, 21 to 23, 40 to 44, Georg Thieme Verlag, Stuttgart, 1963, or in C. R. Martens, Alkyd Resins, pages 51 to 59, Reinhold Plastics Appl. Series, Reinhold Publishing Comp., New York, 1961, all of which are incorporated herein by reference. The carboxylic acids which are preferred for the preparation of polyesters may be aliphatic, cycloaliphatic and/or aromatic in nature. Examples thereof include: succinic acid, adipic acid, suberic acid, azelaic acid, sebacic acid, dodecanedioic acid, 1,4-cyclohexanedicarboxylic acid, phthalic acid, terephthalic acid, isophthalic acid, trimellitic acid, pyromellitic acid, tetrahydrophthalic acid, hexahydrophthalic acid, hexahydroterephthalic acid, endomethylenetetrahydrophthalic acid, glutaric acid, and—where obtainable—their anhydrides or esters. Particular suitability is possessed by dodecanedioic acid, adipic acid, succinic acid, sebacic acid, isophthalic acid, terephthalic acid, hexahydroterephthalic acid, and 1,4-cyclohexanedicarboxylic acid.

Suitable polyols include, for example, monoethylene glycol, 1,2- and 1,3-propylene glycol, 1,4- and 2,3-butylene glycol, di-β-hydroxyethylbutanediol, 1,5-pentanediol, 1,6-hexanediol, 1,8-octanediol, decanediol, dodecanediol, neopentyl glycol, cyclohexanediol, 3(4),8(9)-bis(hydroxymethyl)tricyclo[5.2.1.0$^{2,6}$]decane (Dicidol), 1,4-bis(hydroxymethyl)cyclohexane, 2,2-bis(4-hydroxycyclohexyl)propane, 2,2-bis[4-(β-hydroxyethoxy)phenyl]propane, 2-methyl-1,3-propanediol, 2-methyl-1,5-pentanediol, 2,2,4(2,4,4)-trimethyl-1,6-hexanediol, glycerol, trimethylolpropane, trimethylolethane, hexane-1,2,6-triol, butane-1,2,4-triol, tris(β-hydroxyethyl)isocyanurate, pentaerythritol, mannitol and sorbitol, and also diethylene glycol, triethylene glycol, tetraethylene glycol, dipropylene glycol, polypropylene glycols, polybutylene glycols, xylylene glycol, and neopentyl glycol hydroxypivalate. Preference is given to monoethylene glycol, butanediol, hexanediol, neopentyl glycol, cyclohexanedimethanol, trimethylolpropane, and glycerol.

Crystalline, hydroxyl-containing polyesters prepared in this way have an OH number of 15–150 mg KOH/g, an acid number of <5 mg KOH/g, and a melting point of 40–130° C. It is also possible to use mixtures of crystalline polyesters.

Polyisocyanates I.2 used in the crystalline urethane acrylates of the invention include diisocyanates of aliphatic, (cyclo)aliphatic or cycloaliphatic structure. Representative examples of polyisocyanates are 2-methylpentamethylene 1,5-diisocyanate, hexamethylene diisocyanate, trimethylhexamethylene 1,6-diisocyanate, especially the 2,2,4-isomer and the 2,4,4-isomer and technical-grade mixtures of both isomers, 4,4'-methylenebis(cyclohexyl isocyanate), norbornane diisocyanate, and 3,3,5-trimethyl-1-isocyanato-3-isocyanatomethylcyclohexane (IPDI). Likewise highly suitable are polyisocyanates obtainable by reacting polyisocyanates with themselves by way of isocyanate groups, such as isocyanurates, which come about through reaction of three isocyanate groups. The polyisocyanates may likewise contain biuret or allophanate groups. IPDI is especially preferred.

Examples of suitable polymerizable compounds 1.3 having at least one free OH group and one polymerizable acrylate group include hydroxyethyl acrylate (HEA), hydroxypropyl acrylate, and glycerol diacrylate. Hydroxyethyl acrylate (HEA) is especially preferred.

In order to prepare the crystalline urethane acrylate from the crystalline, OH-containing polyesters I.1, polyisocyanates I.2, and compounds I.3, first of all the polyisocyanate is introduced, DBTL catalyst and IONOL CP (Shell) polymerization inhibitor are added, and the polyester is added in an NCO:OH ratio of 2.5–1.5:1. Following these additions, the reaction is completed at 70–130° C. Thereafter, component I.3, e.g., hydroxyethyl acrylate in a residual NCO:OH ratio of 1.0–1.1:1 is added to the reaction product and the reaction is completed at 70–130° C., so that an NCO content of less than 0.1% is reached. Also possible is a preliminary reaction of a polyisocyanate, such as IPDI, with component I.3 and the addition of this NCO-functional precursor to the hydroxyl-containing crystalline polyester.

Suitable means for radiation-curing the powder coating composition of the invention are accelerated electron beams. The electron beams generate free radicals from the powder coating composition, in a quantity sufficient to ensure extremely rapid polymerization of the reactive acrylate groups. It is preferred to use radiation doses of from 5 to 15 Mrad.

In the case of UV curing, further necessary ingredients used include UV initiators, which are known in principle from conventional liquid UV-curing systems, e.g., EP 633912, incorporated herein by reference. These are substances which on irradiation with UV light break down into free radicals and so start the polymerization. Examples of suitable UV initiators include 2,2'-diethoxyacetophenone, hydroxycyclohexyl phenyl ketone, benzophenone, 2-hydroxy-2-methyl-1-phenylpropan-1-one, xanthone, thioxanthone, benzil dimethyl ketal, etc. UV initiators of this kind are offered commercially, e.g., IRGACURE 184 or DEGACURE 1173 from Ciba. The fraction of the photoinitiator in the overall system is from about 0.5 to 5% by weight.

The use of initiators, such as thioxanthones, phosphine oxides, metallocenes, tertiary aminobenzenes or tertiary aminobenzophenones, which break down into free radicals on irradiation with visible light is likewise possible.

Optional additives are acrylate- or methacrylate-functional compounds, such as the triacrylate of tris(2-hydroxyethyl) isocyanurate (SR 386, Sartomer), for example, and adhesion promoters, which can be used in minor amounts of 0–20% by weight in order to modify the coating properties.

Further customary powder coatings additives include leveling agents, light stabilizers, and devolatilizers. These can be used at 0–5% by weight. Likewise possible is the use of pigments and extenders, e.g., metal oxides such as titanium dioxide, and metal hydroxides, sulfates, sulfides, carbonates, silicates, talc, carbon black, etc., in weight fractions of 0–40%.

For preparing the ready-to-use powder coating composition the ingredients are mixed. The ingredients can be homogenized in suitable apparatus, such as heatable kneading apparatus, for example, but preferably by extrusion, in which case upper temperature limits of 120–130° C. ought not to be exceeded. After cooling to room temperature and appropriate comminution, the extruded mass is ground to give the ready-to-spray powder, without the addition of refrigerants. Application of the ready-to-spray powder to appropriate substrates can be made by the known methods, such as by electrostatic or tribostatic powder spraying, fluidized-bed sintering or electrostatic fluid-bed sintering, for example. Suitable substrates are, for example, untreated or pretreated metallic substrates, wood, wood materials, plastics, glass or paper.

The coatings produced from the powder coating compositions of the invention are weather-stable and highly flexible and possess good adhesion and excellent leveling. They can be formulated to range from highly glossy to matt.

EXAMPLES

Having generally described this invention, a further understanding can be obtained by reference to certain specific examples which are provided herein for purposes of illustration only and are not intended to be limiting unless otherwise specified.

1. Instructions for Preparing the Crystalline, Hydroxyl-Containing Polyester

Acid components and alcohol components are admixed with 0.2 percent by mass of n-butyltin trioctanoate and the mixture is heated to 190° C. under nitrogen and with stirring in an apparatus provided with a distillation column. In the course of the water separation, this temperature is slowly raised to 230° C. After about 98% of the theoretical amount of water have been removed by distillation, the product is cooled and tested for OH number (OHN in mg KOH/g) and acid number (AN in mg KOH/g).

The following polyesters were prepared in this way:

A1: crystalline polyester from DDS 100%, MEG 100%, OHN 35 mg KOH/g, melting point 81° C.

A2: crystalline polyester from BSA 100%, BD 100%, OHN 31 mg KOH/g, melting point 113° C.

A3: crystalline polyester from DMT 60%, ADS 40%, HD 100%, OHN 31 mg KOH/g, melting point 96° C.

BSA: succinic anhydride, DDS: dodecanedioic acid, DMT: dimethyl terephthalate, MEG: monoethylene glycol, BD: 1,4-butanediol, HD: 1,6-hexanediol 2. Preparation of the Crystalline Urethane Acrylate A1U A mixture of 215.9 g of a 1:1 adduct of IPDI and hydroxyethyl acrylate, 2.0 g of IONOL CP and 0.1 g of DBTL is added in portions at 110° C. and with vigorous stirring to 772.0 g of the melted polyester A1 (OHN 35). After stirring for about an hour the NCO content is below 0.1% and the hot reaction mixture is poured from the flask onto a sheet. As soon as the reaction mass has solidified and cooled, it is mechanically comminuted and ground. The melting point of this product is 79° C.

3. Preparation of the Crystalline Urethane Acrylate A2U 103.8 g of the polyester A2 (OHN 31) are melted and the melt is added in portions at 120° C. and with vigorous stirring to a mixture of 16.1 g of IPDI, 0.1 g of IONOL CP and 0.1 g of DBTL. After reaction for 30 minutes a further 10.1 g of hydroxyethyl acrylate are added dropwise. After a further 30 minutes of stirring the NCO content is below 0.1% and the hot reaction mixture is poured from the flask onto a sheet. As soon as the reaction mass has solidified and cooled, it is mechanically comminuted and ground. The melting point of this product is 109° C.

4. Preparation of the Crystalline Urethane Acrylate A3U

A mixture of 24.2 g of IPDI, 0.15 g of IONOL CP and 0.15 g of DBTL is added in portions at 120° C. and with vigorous stirring to 155.7 g of the melted polyester A3 (OHN 31). After reaction for 30 minutes a further 15.2 g of hydroxyethyl acrylate are added dropwise. After a further 45 minutes of stirring the NCO content is below 0.1% and the hot reaction mixture is poured from the flask onto a sheet. As soon as the reaction mass has solidified and cooled, it is mechanically comminuted and ground. The melting point of this product is 92° C.

5. General Preparation of the Inventive Polymers and Powder Coating Compositions of Examples 1 to 3 and of the Comparative Experiment A 100 parts of the crystalline urethane acrylate (A1U, A2U or A3U) are admixed with 0.7 part of BYK 361 (leveling agent, BYK Chemie), 1.0 part of Worlee Add 900 (devolatilizer, Worlée-Chemie) and 1 part of EBECRYL 170 (adhesion promoter, UCB). The comminuted ingredients are intimately mixed in an edge runner mill and then homogenized in an extruder at up to 130° C. After it has cooled, the extrudate is fractionated and ground using a pinned-disk mill, in the case of the comparative experiment with, and in the case of the inventive example without, the addition of refrigerants (liquid nitrogen or dry ice), to a particle size <100 μm. The powder thus prepared is applied to degreased, optionally pretreated standard steel panels using an electrostatic powder spraying unit at 60 kV. The applied powder is then melted under IR irradiation and cured by means of electron beams (15 Mrad).

6. Comparison A

For the comparative example the formulation used was as follows:

82.4 g Uracross P 3125 (DSM Resins)
16.9 g Uracross P 3307 (DSM Resins)
0.7 g Byk 361 (Byk-Chemie)

The test results are summarized in Table 1:

TABLE 1

| Experiment | Crystalline urethane acrylate | Substrate | $EC^1$ [mm] | Bl indir.$^2$ [inch-1b] | $CC^3$ | $\Delta E^4$ |
|---|---|---|---|---|---|---|
| 1 | 100 A1U | Standard steel | >10 | >80 | 0 | 0.5 |
| 2 | 100 A2U | Standard steel | >10 | >80 | 0 | 0.8 |
| 3 | 100 A3U | Standard steel | >10 | >80 | 0 | 1.2 |
| A | Comparison | Standard steel | 6.0 | <10 | 1 | 13.4 |

$^1$Erichsen cupping (DIN 53 156, incorporated herein by reference)
$^2$Indirect ball impact (ASTM D 2797-93, incorporated herein by reference)
$^3$Cross-cut (DIN EN ISO 2409, incorporated herein by reference) (scale 0 (no loss of adhesion) to 5 (total loss of adhesion))
$^4$Yellowing after 2000 h of QUV-A accelerated weathering (DIN 53384, incorporated herein by reference, and DIN ISO 4892-3, incorporated herein by reference)

Only the coatings of experiments 1, 2 and 3 according to the invention exhibit a combination of excellent flexibility, very good adhesion, and extremely high yellowing resistance in exterior weathering. The noninventive, comparative example has weaknesses in all of these points.

Obviously, numerous modifications and variations of the present invention are possible in light of the above teachings. It is therefore to be understood that within the scope of the appended claims, the invention may be practiced otherwise than as specifically described herein.

This application is based on German Patent Application Serial No. 10163825.6, filed on Dec. 22, 2001, and incorporated herein by reference.

What is claimed is:

1. A radiation-curable powder coating composition, comprising:
   I. a binder composed of at least one crystalline urethane acrylate having a melting point ranging from 40 to 130° C. that is prepared from a polyester formed by the reaction of a dicarboxylic acid selected from the group consisting of an aliphatic, cycloaliphatic, aromatic dicarboxylic acid or a combination thereof with a polyol, and
   II. auxiliaries and additives.

2. The radiation-curable powder coating composition as claimed in claim 1, wherein the crystalline urethane acrylate is synthesized by reacting the following components:

I.1) at least one crystalline, hydroxyl-containing polyester having a melting point of 40–130° C. that is prepared from a polyester formed by the reaction of a dicarboxylic acid selected from the group consisting of an aliphatic, cycloaliphatic, aromatic dicarboxylic acid or a combination thereof with a polyol, I.2) at least one polyisocyanate, and I.3) at least one compound containing at least one alcohol group and at least one polymerizable acrylate group.

3. The radiation-curable powder coating composition as claimed in claim 1, wherein the polyester I.1 is synthesized from at least one monomeric dicarboxylic acid selected from the group consisting of dodecanedioic acid, adipic acid, succinic acid, sebacic acid, isophthalic acid, terephthalic acid, hexahydroterephthalic acid and 1,4-cyclohexanedicarboxylic acid, and at least one monomeric polyol selected from the group consisting of monoethylene glycol, butanediol, hexanediol, neopentyl glycol, cyclohexanedimethanol, trimethylolpropane and glycerol.

4. The radiation-curable powder coating composition as claimed in claim 2, wherein the polyisocyanate is at least one polyisocyanate selected from the group consisting of isophorone diisocyanate, hexamethylene diisocyanate, trimethylhexamethylene diisocyanate, dicyclohexylmethyl diisocyanate, 2,2,6-trimethyl-1,4-diisocyanatocyclohexane and norbornane diisocyanate.

5. The radiation-curable powder coating composition as claimed in claim 2, wherein the polyisocyanate is a follow-on product of at least one polyisocyanate selected from the group consisting of isophorone diisocyanate, hexamethylene diisocyanate, trimethylhexamethylene diisocyanate, dicyclohexylmethyl diisocyanate, 2,2,6-trimethyl-1,4-diisocyanatocyclohexane or norbornane diisocyanate.

6. The radiation-curable powder coating composition as claimed in claim 5, wherein the follow-on product is an isocyanurate, allophanate, or biuret.

7. AThe radiation-curable powder coating composition as claimed in claim 2, wherein component I.3 is hydroxyethylacrylate.

8. The radiation-curable powder coating composition as claimed in claim 1, wherein the auxiliaries and additives are UV initiators, leveling agents, light stabilizers, devolatilizers, pigments, fillers, adhesion promoters or further acrylate- and/or methacrylate-functional compounds.

9. The process for preparing a radiation-curable powder coating composition as claimed in claim 1, comprising combining the binder, the auxiliaries, and the additives.

10. The process as claimed in claim 9, wherein the crystalline urethane acrylate I is synthesized by reacting the following components:

I.1 at least one crystalline, hydroxyl-containing polyester having a melting point of 40–130° C. that is prepared from a polyester formed by the reaction of a dicarboxylic acid selected from the group consisting of an aliphatic, cycloaliphatic, aromatic dicarboxylic acid or a combination thereof with a polyol, I.2 at least one polyisocyanate, and I.3 at least one compound containing at least one alcohol group and at least one polymerizable acrylate group.

11. The process as claimed in claim 9, wherein the polyester I.1 is synthesized from at least one monomeric dicarboxylic acid selected from the group consisting of dodecanedioic acid, adipic acid, succinic acid, sebacic acid, isophthalic acid, terephthalic acid, hexahydroterephthalic acid and 1,4-cyclohexanedicarboxylic acid, and at least one monomeric polyol selected from the group consisting of monoethylene glycol, butanediol, hexanediol, neopentyl glycol, cyclohexanedimethanol, trimethylolpropane and glycerol.

12. The process as claimed in claim 10, wherein the polyisocyanate is at least one polyisocyanate selected from the group consisting of isophorone diisocyanate, hexamethylene diisocyanate, trimethylhexamethylene diisocyanate, dicyclohexylmethyl diisocyanate, 2,2,6-trimethyl-1,4-diisocyanatocyclohexane and norbornane diisocyanate.

13. The process as claimed in claim 10, wherein component I.3 is hydroxyethylacrylate.

14. The process as claimed in claim 9, wherein the auxiliaries and additives are selected from the group consisting of leveling agents, light stabilizers, devolatilizers, pigments, fillers, adhesion promoters and further acrylate- and/or methacrylate-functional compounds.

15. The process as claimed in claim 9, wherein the binder and the auxiliaries and additives are combined at a temperature of at most 120° C.

16. The process as claimed in claim 9, wherein the binder and the auxiliaries and additives are combined at a temperature of at most 130° C.

17. The process as claimed in claim 9, wherein the binder and the auxiliaries and additives are combined in a heatable kneading apparatus.

18. A process for producing a coating, comprising applying the radiation-curable powder coating composition of claim 1 to a substrate.

19. The process as claimed in claim 18, further comprising curing the composition.

20. The process as claimed in claim 18, wherein the coating is a glossy coating.

21. The process as claimed in claim 18, wherein the coating is a mart coating.

22. The process as claimed in claim 18, wherein the substrate is selected from the group consisting of untreated or pretreated metallic substrates, wood, wood materials, plastics, glass or paper.

23. The radiation-curable powder coating composition as claimed in claim 1, wherein the at least one crystalline, hydroxyl-containing polyester has an OH number of 15–150 mg KOH/g, an acid number of $\leq 5$ mg KOH/g and a melting point of 40 to 130° C.

* * * * *